United States Patent [19]

Pace

[11] 4,317,282
[45] Mar. 2, 1982

[54] WOOD SANDING, GRASS AND WOOD CUTTING ELECTRIC DRILL ATTACHMENT DEVICE

[76] Inventor: Paul D. Pace, 347 72nd St., Brooklyn, N.Y. 11209

[21] Appl. No.: 164,180

[22] Filed: Jun. 30, 1980

[51] Int. Cl.³ .................... A01D 53/12; B23B 45/14; B24B 23/06
[52] U.S. Cl. ........................................ 30/122; 30/500; 51/170 EB; 173/170; 408/20
[58] Field of Search .................... 408/20; 30/122, 500, 30/210; 173/170; 144/134 D, 136 C; 403/349; 51/170 EB

[56] References Cited

U.S. PATENT DOCUMENTS 2,840,904 7/1958 Hutchins ........................... 30/210
4,103,511 8/1978 Kress et al. ...................... 403/349 X Primary Examiner—Z. R. Bilinsky
Attorney, Agent, or Firm—Richard L. Miller

[57] ABSTRACT

An attachment for a conventional portable electric drill, so as to serve for sanding wood, cutting grass or cutting wood; the attachment supporting either a frame having a pair of rollers around which an endless sanding belt is driven, the attachment otherwise supporting a base holding a rotatable circular saw blade, and the attachment still otherwise holding a frame having a rotatable shaft on which a grass cutting blade is mounted and enclosed under a protective shield.

4 Claims, 6 Drawing Figures

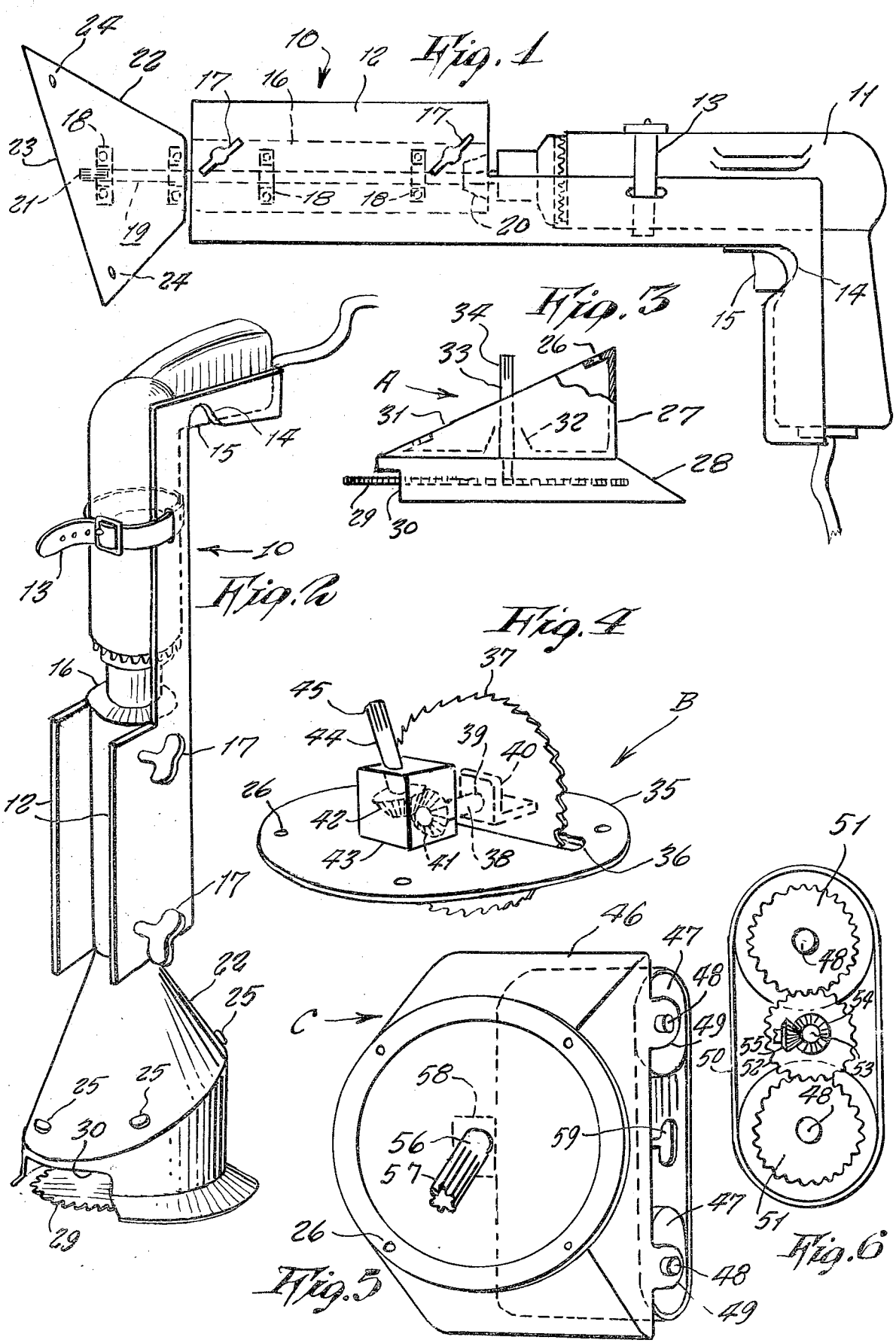

WOOD SANDING, GRASS AND WOOD CUTTING ELECTRIC DRILL ATTACHMENT DEVICE

BACKGROUND OF THE INVENTION

It is well known that with the increasing change of persons living in private houses instead of in rented apartments, more working tools are needed by such persons, for any handicraft that they may pursue, and which involves usually small hand tools, and most possibly also a portable electric drill due to its ability for versatile uses in drilling, grinding, buffing, polishing and the like.

SUMMARY OF THE INVENTION

It is a principal object of the present invention to provide an attachment for aiding all such persons in using their own portable electric drills for additional other chores that may need to be done, and which includes sanding wood, sawing wood lumber and also cutting grass, so that it is not necessary to spend money for separate other machines for doing such work.

Still another object is to provide an attachment which is quickly and easily atachable to the portable electric drill.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a side view of the invention.

FIG. 2 is a perspective view thereof shown in use.

FIG. 3 is a side elevation view of a modified design shown including a blade.

FIG. 4 is a perspective view of a wood cutting attachment.

FIG. 5 is a perspective view of a sanding attachment.

FIG. 6 is an opposite side view thereof showing the gearing thereof.

DETAILED DESCRIPTION OF PREFERRED EMBODIMENT

Referring now to the drawing in greater detail, the reference numeral 10 represents, in FIGS. 1 and 2, an attachment device according to the present invention, and which is attachable to a conventional electric portable drill 11 in order that it can be used for supporting either an accessory A for cutting grass, an accessory B for cutting wood or else an accessory C for sanding wood.

The attachment includes an assembly consisting of a pair of side panels 12 which are secured to opposite sides of the portable electric drill and its handle by means of a strap 13. A notch 14 on the panels allows access for a finger to squeeze the trigger 15 of the drill. A housing 16 secured by screws 17 between the side panels, supports bearings 18 for a main shaft 19 secured at one end in the chuck 20 of the drill. An opposite end of the shaft has a splined opening 21 for connection to either of the accessories A, B or C.

A conical shaped hood 22 is formed on an end of the housing and contains the end of the main shaft as well as additional bearings 18 therefor. As clearly shown, the flared end of the conical hood has a circular edge 23 that is on a plane at a tilted angle to a longitudinal axis of the main shaft and its housing. A plurality of holes 24 near the edge 23 are provided to receive removable screws 25 that secure either of accessories A, B or C to the attachment, the screws engaging threaded holes 26 on the accessories.

The accessory A, shown in FIG. 3, includes a cylindrical shield 27 having a flare 28 at one end so as to contain a grass cutting blade 29. A notch 30, on the flare, exposes a portion of the blade from a side so that it can be moved against a side of growing grass in order to cut the same. The opposite end of the shield has an angularly inclined edge 31 that mates with equally inclined edge 23 so that a bearing 32 secured inside a center of the shield, supports a shaft 33 of the cutting blade in straight alignment with the main shaft, a spline 34 on the shaft 33 engaging the main shaft splined hole.

In operative use, when the trigger 15 is depressed, the cutting blade rotates so as to cut grass. In use the tool is held in a vertical position, as shown in FIG. 2 so as to allow cutting grass close to walls or sidewalks with precision.

The accessory B, shown in FIG. 4, serves for cutting wood, and includes a flat base plate 35 having a central slot 36 through which a circular saw blade 37 extends; the blade being affixed on a shaft 38 supported at one end in a bearing 39 of a bracket 40 mounted on the plate. An opposite end of the shaft is affixed to a gear 41 engaging a gear 42 inside a gear box 43 also mounted on the plate 35. The gear 42 is on a shaft 44 having a spline 45 so as to engage main shaft 19. The shaft 44 extends angularly inclined from the gear box and the plate, so that the tool is pushed ahead of a person while cutting wood.

The accessory C shown in FIGS. 5 and 6, serves to sand wood, and includes a frame 46 supporting a pair of spaced apart rollers 47 on shafts 48 journalled in bearings 49 of the frame. An endless sanding belt 50 extends around the two rollers. A gear 51 affixed on each shaft 48 engages a gear 52 on a shaft 53. A bevel gear 54 affixed on the shaft 53, engages a gear 55 on a shaft 56 extending inclined from the frame and which is engagable by a spline 57 to the mainshaft 19, the shaft 56 being journalled in a bearing block 58 of the frame 46.

A key 59 on the frame serves to adjust the rollers separation apart so that the belt can be made selectively taut.

Housing 16 could be made adjustable for differences in height and length of the drive shafts for certain drill models. There is a support panel between side panels 12 and directly below housing 16. A support panel or molded handle may be used to give additional support of drill models.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A wood sanding, grass and wood cutting electric drill attachment device comprising a pair of side panels for mounting to an electric drill, each of said side panels having a first right-angled portion for projection forwardly of a drill when said side panels are mounted to a drill, said right-angled protion comprising a slot formed therethrough; a belt fastening means for fastening said first portions of said side panels to a drill, said belt fastening means extending through each said slot, and fastens said side panels to a drill by enveloping the circumference of a drill at an optimal location; an elongated housing mounted between and within said second elongated portions of said pair of side panels; means for securing said housing therein; a main shaft rotatably mounted in said housing, said housing having bearing means positioned therein for rotatably supporting said main shaft, said main shaft having a first end projecting outwardly beyond a first end of said housing adjacent said first right-angled portions, said first end of said main shaft being receivably mounted in a chuck of a drill, and a second end projecting substantially beyond the other end of said housing away from said first right-angled portions; a truncated conically-shaped hood member having bearing means mounted therein; said bearing means of said hood member rotatably supporting said second end of said main shaft, said hood member having its truncated portion positioned adjacent to said other end of said housing and flares outwardly therefrom away from said housing and said side panels, said hood member defining as angled attachment surface at the base thereof of elliptical cross-section whereby special attachment for cutting and sanding may be connected to a power drill for operation thereby.

2. The device according to claim 1, further comprising a grass cutting accessory, said grass cutting accessory comprising a housing having a flared shield; a grass cutting circular saw mounted rotatably in said shield, said flared shield having a notch formed on a circumferential portion thereof through which a portion of said circular saw projects for cutting purposes; said housing further comprising main body portion having a first surface integrally connected with said flared shield and a second canted surface, said second canted surface having an angle of inclination equal to the angle of inclination of the flared base of said hood member; a shaft rotatably mounted in said housing having a first end connected to said circular saw at the axial center thereof, and a second end remote from said first end and projecting beyond said canted surface for mating engagement with said second end of said main shaft; said housing further comprising bearing means for rotatably supporting said shaft; said second end of said main shaft being formed with a splined opening and said second end of said shaft being formed with a splined outer surface for matingly engaging each other; and means for securing said canted surface to said hood member.

3. The device according to claim 1, further comprising a wood cutting accessory, said wood cutting accessory comprising a circular plate member having a plurality of holes for attaching said plate member to said hood member at the flared base of said hood member, said plate member having an elongated slot formed along a portion thereof removed from the center thereof; a circular saw mounted rotatably in said plate member through said elongated slot such that a portion of said saw projects above the top surface of said plate member and a portion thereof projects below the bottom surface of said plate member, said portion thereof projects below the bottom surface of said plate member, said portion of said saw projecting below said bottom surface of said plate member constituting the cutting location of the saw; bracket means for mounting said saw on said plate member, and a secondary shaft rotatably mounted in said bracket means rotatably mounting said circular saw; a gear box mounted on the top surface of said plate member having a first gear connected to said secondary shaft at the end thereof remote from said bracket means, and a second gear in meshing engagement with said first gear; a tertiary shaft having said second gear affixed at one end thereof and having another end remote from said gear box and having a splined outer surface, said tertiary shaft projecting an acute angle relative to the plane containing the top surface of said plate member; said second end of said main shaft having a splined opening for matingly receiving said splined outer surface of said another end of tertiary shaft.

4. The device according to claim 1, further comprising a wood sanding accessory, said wood sanding accessory comprising a frame rotatably mounting thereon a pair of spaced rollers; an endless belt enveloping said pair of rollers by which wood may be sanded; a pair of gear wheels, one of said gear wheels being mounted to one of said pair of rollers to rotate therewith, and the other of said pair of gear wheels having a shaft extending from the axial center thereof said shaft having at its free end a first bevel gear for rotation therewith; a connecting shaft having a first end having a second end projecting through said frame and projecting from the planar surface of said frame at an acute angle, to allow for forward positioning of said acute angle to allow for forward positioning of said accessory relative to said hood member to facilitate movement of the accessory along an article it is sanding; said frame further having means for securing said accessory to said hood member.

* * * * *